United States Patent
Seok

(10) Patent No.: US 9,609,678 B2
(45) Date of Patent: Mar. 28, 2017

(54) METHOD AND APPARATUS FOR ASYNCHRONOUS DIRECT LINK SETUP IN WLAN SYSTEM

(71) Applicant: LG ELECTRONICS INC., Seoul (KR)

(72) Inventor: Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 80 days.

(21) Appl. No.: 14/518,963

(22) Filed: Oct. 20, 2014

(65) Prior Publication Data

US 2015/0036640 A1     Feb. 5, 2015

Related U.S. Application Data

(63) Continuation of application No. 13/319,297, filed as application No. PCT/KR2010/002916 on May 7, 2010, now Pat. No. 8,885,538.

(60) Provisional application No. 61/176,489, filed on May 8, 2009.

(51) Int. Cl.
| | |
|---|---|
| H04W 4/00 | (2009.01) |
| H04J 3/24 | (2006.01) |
| H04W 76/02 | (2009.01) |
| H04W 72/04 | (2009.01) |
| H04W 74/08 | (2009.01) |
| H04W 84/12 | (2009.01) |
| H04W 88/08 | (2009.01) |

(52) U.S. Cl.
CPC ....... *H04W 76/023* (2013.01); *H04W 72/042* (2013.01); *H04W 72/0406* (2013.01); *H04W 74/0816* (2013.01); *H04W 84/12* (2013.01); *H04W 88/08* (2013.01)

(58) Field of Classification Search
CPC ............. H04W 92/18; H04W 72/0406; H04W 52/0219; H04W 76/023
See application file for complete search history.

(56) References Cited

U.S. PATENT DOCUMENTS

| | | | |
|---|---|---|---|
| 7,443,821 B2 | 10/2008 | Cave et al. | |
| 2003/0231608 A1 | 12/2003 | Wentink | |
| 2005/0053015 A1* | 3/2005 | Jin et al. | ........................ 370/254 |
| 2005/0282551 A1 | 12/2005 | Tandai et al. | |
| 2006/0050742 A1 | 3/2006 | Grandhi et al. | |
| 2006/0165035 A1 | 7/2006 | Chandra et al. | |
| 2007/0104138 A1 | 5/2007 | Rudolf et al. | |
| 2008/0075038 A1 | 3/2008 | Jin et al. | |
| 2008/0112351 A1 | 5/2008 | Surineni et al. | |
| 2009/0073945 A1 | 3/2009 | Seok | |
| 2009/0116430 A1 | 5/2009 | Bonta et al. | |
| 2009/0156224 A1 | 6/2009 | Matsumaru | |

\* cited by examiner

*Primary Examiner* — Melanie Jagannathan
(74) *Attorney, Agent, or Firm* — Birch, Stewart, Kolasch & Birch, LLP

(57) ABSTRACT

A method for a wireless local area network, the method including selecting, by an access point (AP), a direct link setup (DLS) channel among a plurality of channels, the DLS channel being used for a communication of a DLS link between a first station and a second station; and transmitting, by the AP, a control frame to the first station and the second station, the control frame including a channel field indicating the DLS channel.

5 Claims, 4 Drawing Sheets

METHOD AND APPARATUS FOR ASYNCHRONOUS DIRECT LINK SETUP IN WLAN SYSTEM

CROSS-REFERENCE TO RELATED APPLICATIONS

This application is a Continuation of copending application Ser. No. 13/319,297, filed on Nov. 7, 2011, which was filed as the National Phase of PCT/KR2010/002916 on May 7, 2010, which claims the benefit under 35 U.S.C. §119(e) to U.S. Provisional Application No. 61/176,489, filed on May 8, 2009, all of which are hereby expressly incorporated by reference into the present application.

BACKGROUND OF THE INVENTION

Field of the Invention

The present invention relates to wireless communication, and more particularly, to an asynchronous Direct Link Setup (DLS) scheme in which a channel bandwidth is divided and frames are independently transmitted in the divided bandwidths between DLS connection and non-DLS connection in a Wireless Local Access Network (WLAN) system.

Discussion of Related Art

With the development of the information communication technology, various wireless communication technologies are being developed. From among them, the WLAN technology has been developed to wirelessly access the Internet in specific service areas, such as homes, companies, and aircraft, using portable terminals, such as Personal Digital Assistants (PDAs), laptop computers, and Portable Multimedia Players (PMPs) based on the wireless frequency technology.

The WLAN technology at the early stage was developed to support the 1 to 2 Mbps speed through frequency hopping, band spreading, and infrared communication using a frequency of 2.4 GHz through IEEE 802.11. With the recent development of the wireless communication technology, an Orthogonal Frequency Division Multiplexing (OFDM) technology, etc. is applied to the WLAN technology in order to support a maximum speed of 54 Mbps. In addition, in IEEE 802.11, wireless communication technologies for the improvement of Quality of Service (QoS), an Access Point (AP) protocol compatibility, security enhancement, radio resource measurement, wireless access in vehicular environments, fast roaming, a mesh network, inter-working with an external network, and wireless network management have been developed and commercialized or are being developed.

In IEEE 802.11, a Basic Service Set (BSS) refers to a set of STAs which are successfully synchronized, and a Basic Service Area (BSA) refers to an area including members constituting a BSS. The BSA may be changed depending on the propagation characteristic of a wireless medium, and so it has an obscure boundary. The BSS may be basically classified into an Independent BSS (IBSS) and an Infrastructured BSS. The independent BSS forms a self-contained network and refers to a BSS which is not permitted to access a Distribution System (DS). The infrastructured BSS includes one or more APs, DSs, etc. and chiefly refers to a BSS in which the APs are used in all communication processes including communication between STAtions (STAs).

In accordance with the early WLAN communication procedure, in the infrastructured BSS, it was required that the direction transmission of data between non-AP STAs be not permitted, but data be transmitted via an AP. Recently, to improve the efficiency of wireless communication, DLS between non-AP STAs is supported. In this technology, in a BSS supporting QoS (i.e., a Quality of Service BSS (QBSS) composed of a QSTA and a QAP), non-AP stations may set up a direct link and directly communicate with each other through the direct link even without passing through the QAP.

Meanwhile, with the spread of a WLAN being activated and applications using the WLAN being diversified, there is an emerging need for a new WLAN system capable of supporting a higher throughput than the data processing speed supported by IEEE 802.11n. However, an IEEE 802.11n Medium Access Control (MAC)/Physical Layer (PHY) protocol is not effective in providing the throughput of 1 Gbps or more. This is because the IEEE 802.11n MAC/PHY protocol is for the operation of a single STA (i.e., an STA having one Network Interface Card (NIC) and so overhead is added with an increase in the throughput of frames with the existing IEEE 802.11n MAC/PHY protocol remained intact. Consequently, there is a limit to the improvement of the throughput of a wireless communication network with the existing IEEE 802.11n MAC/PHY protocol (i.e., a single STA architecture) remained intact.

Accordingly, to achieve the data processing speed of 1 Gbps or more in a wireless communication network, there is a need for a new system different from the IEEE 802.11n MAC/PHY protocol (i.e., the existing single STA architecture). A Very High Throughput (VHT) WLAN system is the next version of the IEEE 802.11n WLAN system and is one of IEEE 802.11 WLAN systems which are recently newly proposed in order to support the data processing speed of 1 Gbps or more in a MAC Service Access Point (SAP).

The VHT WLAN system allows a plurality of VHT STAs to simultaneously access and use a radio channel so as to efficiently use radio channels. To this end, the VHT WLAN system supports the transmission of a Multi-User Multiple Input Multiple Output (MU-MIMO) method using multiple antennas. A VHT AP may perform a Spatial Division Multiple Access (SDMA) transmission method of transmitting spatial multiplexed data to a plurality of VHT STAs.

In the case in which DLS is used, a throughput gain through SDMA transmission between an AP and an STA may not be obtained because transmission using SDMA may not be simultaneously performed between the AP and the STA. In the case in which a direct link is set up between STAs and transmission and reception are performed therebetween, a method of performing transmission using SDMA between an AP and an STA and an STA supporting the method need to be taken into consideration.

SUMMARY OF THE INVENTION

The present invention provides an asynchronous DLS method of independently performing transmission using DLS and transmission using SDMA simultaneously in a WLAN system.

The present invention also provides an AP and an STA which can support the asynchronous DLS method.

An aspect of the present invention, a Direct Link Setup (DLS) method performed by an Access Point (AP) in a Wireless Local Access Network (WLAN) system is provided. The DLS method includes receiving a DLS request frame, requesting to set up a Direct Link (DL), from a DLS initiator, transmitting an Async-DLS request frame, including an Async-DLS channel set wherein the Async-DLS channel set is information of a channel on which the DL is scheduled to be set up, to a DLS responder indicated by the DLS request frame, receiving a DLS response frame from the DLS responder in response to the Async-DLS request frame, and transmitting an Async-DLS response frame including the Async-DLS channel set to the DLS initiator.

The DLS initiator may perform Clear Channel Assessment (CCA) only on the Async-DLS channel set, and transmits a frame on the Async-DLS channel set.

The DLS method may further include broadcasting an Async channel reservation frame including information indicating duration for which the Async-DLS channel set is used for the DLS.

The DLS initiator may transmit a Request To Send (RTS) frame to the DLS responder after receiving the Async-DLS response frame, and the DLS responder may transmit a Clear To Send (CTS) frame to the DLS initiator in response to the RTS frame.

The transmission of a frame through the DL between the DLS initiator and the DLS responder may be performed independently from transmission or reception of a frame between the AP and at least one third station (STA).

The transmission of the frame between the AP and the at least one third STA may be terminated before the transmission of a frame through the DL between the DLS initiator and the DLS responder is terminated.

The DLS method may further include transmitting an information frame for updating CCA information about the DLS initiator and the DLS responder when the transmission of a frame through the DL between the DLS initiator and the DLS responder is terminated.

The information frame may include the DL timeout and identifier information about the DLS initiator and the DLS responder.

In another aspect of the present invention, a DLS method in a WLAN system is provided. The DLS method includes transmitting a DLS request frame for setting up a Direct Link (DL) with a DLS responder to an AP, and receiving an Async-DLS response frame, including an Async-DLS channel set wherein the Async-DLS channel set is information of a channel on which the DL is scheduled to be set up, from the AP in response to the DLS request frame.

The DLS method may further include performing CCA on only the Async-DLS channel set, and transmitting a frame on the Async-DLS channel set in which the DL is set up.

The DLS method may further include receiving the Async-DLS response frame, transmitting an RTS frame to the DLS responder, and receiving a CTS frame from the DLS responder in response to the RTS frame.

The transmission of a frame through the DL between the DLS initiator and the DLS responder may be performed independently from transmission or reception of a frame between the AP and at least one third STA.

The DLS method may further include receiving an information frame from the AP and updating CCA information based on the information frame, when transmission of a frame through the DL between the DLS initiator is terminated.

In accordance with the present invention, inter-STA transmission using DLS, together with transmission between an AP and an STA using an SDMA mechanism, can be supported. Accordingly, the general use efficiency of radio resources can be enhanced.

DETAILED DESCRIPTION OF THE INVENTION

Hereinafter, embodiments of the present invention will be described in detail with reference to the accompanying drawings.

The following embodiments may be usefully applied to a VHT WLAN system using a channel having a bandwidth of 80 MHz. Although an example in which the present invention is applied to a VHT system is described below, the present invention is not limited to the above example. The bandwidth of a channel is not limited to 80 MHz, and the present invention may be applied to a WLAN system using a channel having a bandwidth of 40 MHz or 80 MHz or more. The channel may be composed of two or more subchannels, and the subchannels may be adjacent to each other or may not be adjacent to each other by a guard band. One or more STAs may transmit or receive frames to or from an AP using an SDMA method. Hereinafter, transmission from an STA to an AP is called uplink transmission, and transmission from an AP to an STA is called downlink transmission.

In accordance with an embodiment of the present invention, during the time for which STAs perform uplink/downlink transmission using one subchannel, the STAs may set up a direct link therebetween and perform uplink/downlink transmission using the other subchannel. Such a method is called Asynchronous DLS (Async-DLS). Likewise, the transmission of frames, etc. through the Async-DLS is called Async-DLS transmission, and a set of subchannels used for the Async-DLS is called an Async-DLS channel set. The Async-DLS channel set may include one or more subchannels.

In accordance with an embodiment of the present invention, in a WLAN system, an AP supporting the Async-DLS proposed by the present invention informs STAs of an Async-DLS channel set. To this end, the AP transmits a frame, including an Async-DLS channel set information element, to the STAs. The frame including the Async-DLS channel set information element may be a newly defined management action frame or a control frame or a management frame in accordance with the IEEE 802.11 standard. For example, the frame may be transferred through a probe response frame transmitted by an AP in response to a probe request frame, an association response frame transmitted by an AP in response to an association request frame transmitted by an STA, or a beacon frame periodically transmitted by an AP. Alternatively, Async-DLS channel set information may be transferred to an STA using a DLS request frame or a DLS response frame.

Figure 1:
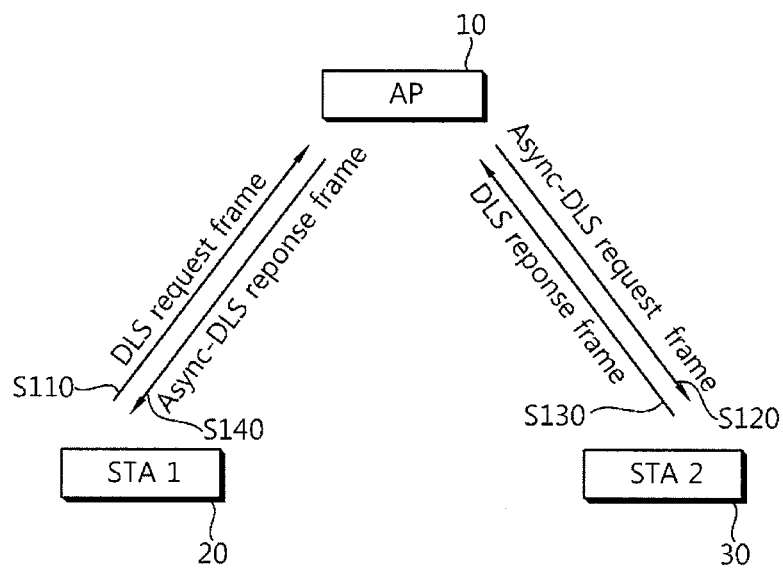
FIG. 1 is a message flowchart illustrating an example of an Async-DLS setup procedure in a WLAN system supporting Async-DLS which is proposed by the present invention.

FIG. 1 is a message flowchart illustrating an example of an Async-DLS setup procedure in a WLAN system supporting Async-DLS which is proposed by the present invention.

A STA 1 20 (i.e., an Async-DLS initiator to initiate Async-DLS) transmits a DLS request frame to an AP 10 at step S110. The AP 10 supporting the Async-DLS transmits an Async-DLS request frame, having an Async-DLS channel set information element added to the DLS request frame received from the STA 1 20, to an STA 2 30 (i.e., an Async-DLS responder which is an Async-DLS target STA) at step S120. The STA 2 30 which has accepted the Async-DLS transmits a DLS response frame to the AP 10 at step S130. The AP 10 transmits an Async-DLS response frame, including the Async-DLS channel set information element added to the DLS response frame received from the STA 2, to the STA 1 20 (i.e., the Async-DLS initiator) at step S140. Through the steps S110, S120, S130, and S140 of FIG. 1, the STA 1 20 and the STA 2 30 may perform Async-DLS and directly transmit and receive frames without passing through the AP 10.

Table 1 shows an example of information elements included in the Async-DLS request frame.

TABLE 1

| Order | Information |
|---|---|
| 1 | Category |
| 2 | Action |
| 3 | Destination MAC Address |
| 4 | Source MAC Address |
| 5 | Capability Information |
| 6 | Async-DLS Timeout Value |
| 7 | Supported Rates |
| 8 | Extended Supported Rates |
| 9 | Async-DLS Channel Set |

The function of each of the fields in Table 1 is described in short below. The Category field and the Action field simply represent the category and the operational contents of a corresponding frame. The Category field and the Action field represent that the corresponding frame is related to Async-DLS and is a control signal. The Destination MAC Address field may be set as the MAC address of an Async-DLS responder. The Source MAC Address field may be set as the MAC address of an Async-DLS initiator. The Capability Information field includes capability information of the Async-DLS initiator. The Async-DLS Timeout value field is used to indicate the timeout value for an asynchronous direct link in an Async-DLS Request frame. The length of the Async-DLS Timeout Value field may be 2 octets. The Supported Rates field and the Extended Supported Rates field may include information about a rate supported by the Async-DLS initiator. The Async-DLS Channel Set field includes information about a channel set to be used in Async-DL according to the present invention.

Table 2 shows an example of an information element included in the Async-DLS response frame.

TABLE 2

| Order | Information |
|---|---|
| 1 | Category |
| 2 | Action |
| 3 | Status Code |
| 4 | Destination MAC Address |
| 5 | Source MAC Address |
| 6 | Capability Information |
| 7 | Supported Rates |
| 8 | Extended Supported Rates |
| 9 | Async-DLS Channel Set |

The function of each of the fields in Table 2 is described in short below. The Category field and the Action field simply represent the category and the operational contents of a corresponding frame. The Category field and the Action field may represent that the corresponding frame is related to Async-DLS and is a control signal for a response to an Async-DLS request. The Status Code field is used in an Async-DLS response frame to indicate 'accep' or 'deny' for a requested operation. The length of the Status Code field may be 2 octets. A value of the Destination MAC Address field and the Source MAC Address field is equal to a value corresponding to an Async-DLS request frame. The Capability Information field includes capability information about an Async-DLS responder. The Supported Rates field and the Extended Supported Rates field may include information about a rate supported by an Async-DLS responder. The Async-DLS Channel Set field includes information about a channel set to be used in Async-DLS according to the present invention.

In accordance with an embodiment of the present invention, direct transmission between STAs in Async-DLS, may be performed only in an Async-DLS channel set. Accordingly, when performing transmission to an Async-DLS responder, an Async-DLS initiator may perform clear channel assessment (CCA) for determining the current state of a Wireless Medium (WM) only for the Async-DLS channel set. CCA may not be performed on subchannels through which uplink/downlink transmission is performed between an AP and STAs, other than Async-DLS channel set. If, as a result of the CCA, the Async-DLS channel set is idle, a channel is accessed in accordance with a channel access method (e.g. Enhanced Distributed Channel Access (EDCA)) of the IEEE 802.11 standard and a frame is transmitted and received through the channel.

In accordance with an embodiment of the present invention, an Async-DLS channel set may be reserved for Async-DLS. In this case, uplink/downlink transmission between an AP and STAs is not performed through the Async-DLS channel set, and the Async-DLS channel set is used only for the Async-DLS. However, a reservation duration may be set for spectrum efficiency. During the reservation duration, the Async-DLS channel set may be used only for the Async-DLS. When the reservation duration is expired, the Async-DLS channel set may be used for uplink/downlink transmission between an AP and STAs other than the Async-DLS.

To notify the duration in which the Async-DLS channel set is used only for the Async-DLS, an AP may broadcast an Async-DLS channel reservation frame to STAs. The Async-DLS channel reservation frame is used to notify that access to a specific subchannel is limited because the subchannel is used only for the Async-DLS during the reservation duration. The Async-DLS channel reservation frame includes information about the reservation duration in which the specific subchannel is used only for the Async-DLS. An STA which has received the Async-DLS channel reservation frame may defer access to the specific subchannel during the reservation duration.

In accordance with another embodiment of the present invention, an Async-DLS channel may be shared by STAs and an AR In other words, if Async-DLS transmission is not performed in an Async-DLS channel set, the Async-DLS channel may be used for uplink/downlink transmission between the AP and the STA. If uplink/downlink transmission is permitted in an Async-DLS channel set, an Async-DLS initiator trying to perform Async-DLS in the Async-DLS channel set has to notify an AP that the Async-DLS channel set will be used for the Async-DLS. To this end, the Async-DLS initiator may transmit a Request To Send (RTS) frame to the AP, and the AP may transmit a Clear To Send (CTS) frame to an Async-DLS responder. In an alternative method, an AP and an STA may know that an Async-DLS channel set will be used for Async-DLS by overhearing an RTS frame and a CTS frame transmitted between STAs. The remaining STAs and APS other than an STA, setting up Async-DLS, and a target STA may be deferred accessing the Async-DLS channel set.

Figure 2:
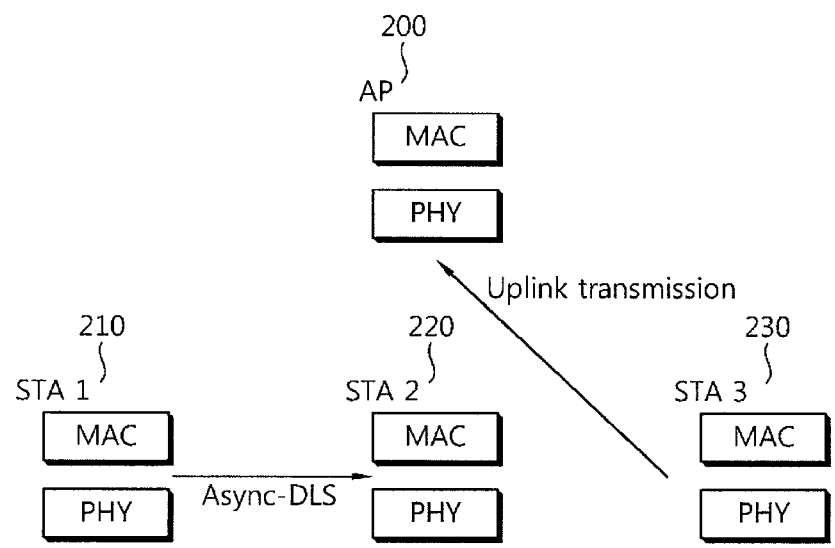
FIG. 2 is a diagram showing an example of Async-DLS according to an embodiment of the present invention.

FIG. 2 is a diagram showing an example of Async-DLS according to an embodiment of the present invention.

A STA 1 210 (i.e., an Async-DLS initiator) sets up Async-DLS with an STA 2 220 (i.e., an Async-DLS responder) in an Async-DLS channel set in accordance with the above method. During the time for which the STA 1 210 and the STA 2 220 transmit and receive frames using the Async-DLS channel set, an AP 200 may perform uplink/downlink transmission to an STA 3 230 through another subchannel. The channel used for the uplink/downlink transmission and the channel used for the Async-DLS may be neighboring channels or channels which are separated from each other by a guard band.

When Async-DLS transmission between the STA 1 210 and the STA 2 220 is finished, the STA 1 210 and the STA 2 220 may not know CCA information about a subchannel which is used by the AP 200 and the STA 3 230. For example, it is assumed that the STA 1 210 and the STA 2 220 perform Async-DLS using a first subchannel and after transmission is started, the AP 200 and the STA 3 230 start uplink or downlink transmission using a second subchannel. When the STA 1 210 and the STA 2 220 finish the Async-DLS, the STA 1 210 and the STA 2 220 do not know CCA information about the second subchannel and can recognize that the second subchannel is idle. Actually, the STA 1 210 or the STA 2 220 which does not know that the AP 200 is performing SDMA transmission to the STA 3 230 or a plurality of STAs in the second subchannel may attempt transmission to the AP 200, the STA 3 230, or the plurality of STAs, thus generating a hidden node problem.

To solve the above hidden node problem, the AP 200 may terminate uplink/downlink transmission to the plurality of STAs before the Async-DLS is finished in accordance with the method proposed by the present invention. In the example of FIG. 2, before the Async-DLS transmission between the STA 1 210 and the STA 2 220 is finished, the AP 200 may terminate the uplink/downlink transmission to the STA 3 230 in order to prevent uplink/downlink transmission between the AP 200 and the STA 3 230 even after the Async-DLS is finished. Such a method can prevent the occurrence of the hidden node problem, but affect spectrum efficiency because the time taken for the uplink/downlink transmission to be performed between the AP and the STA and is relatively reduced.

In accordance with another method proposed by the present invention, to solve the above hidden node problem, after the Async-DLS is finished, the CCA information about the STAs participated in the Async-DLS may be updated. Referring to, for example, FIG. 2, when the Async-DLS between the STA 1 210 and the STA 2 220 is finished, the AP 200 informs the STA 1 210 and the STA 2 220 that the uplink/downlink transmission is being performed between the AP 200 and the STA 3 230 through the second subchannel To this end, the AP 200 may transmit, to the STA 1 210 and the STA 2 220, a frame including information about the duration of the uplink/downlink transmission and about the STAs participating in the uplink/downlink transmission.

Figure 3:
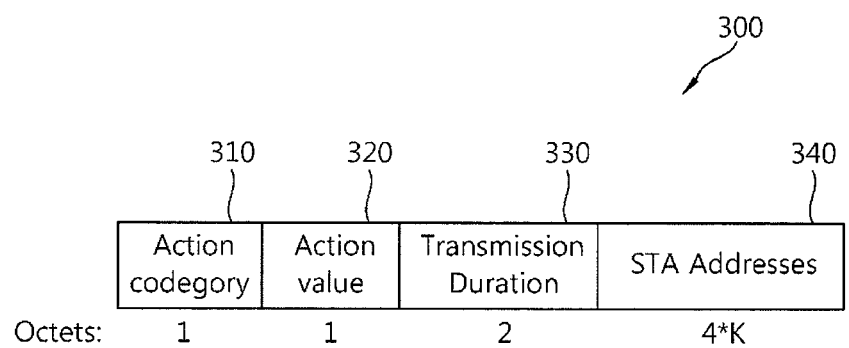
FIG. 3 is a block diagram showing an example of an Async-DLS control frame format, sent to an AP and STAs participated in Async-DLS, after the Async-DLS is terminated.

FIG. 3 is a block diagram showing an example of an Async-DLS control frame format, sent to an AP and STAs participated in Async-DLS, after the Async-DLS is terminated.

The Async-DLS control frame 300 includes fields, including Action Category 310, Action Value 320, Transmission Duration 330, and STA Addresses 340. The field Action Category 310 and the field Action Value 320 simply show the category and the operational contents of a corresponding frame. That is, the corresponding frame is related to Async-DLS and is a control signal to inform the transmission situation in a subchannel.

The field Transmission Duration 330 includes information about the duration in which uplink/downlink transmission is performed between an AP and an STA. The duration is the time taken for transmission to be performed between the AP and the STA and it may be a TXOP (transmission opportunity) duration of an STA which performs uplink/downlink transmission to an AP. In other words, the duration indicated by the field Transmission Duration 330 indicates that the uplink/downlink transmission may continue between the AP and the STA.

The field STA Addresses 340 includes information about an STA participating in uplink/downlink transmission to an AP. The information indicating an STA may be the MAC address of the STA.

An AP may broadcast or unicast the Async-DLS control frame 300 to STAs participated in Async-DLS. An STA participated in the Async-DLS receives the Async-DLS control frame 300 and may know that transmission is being performed between the AP and another STA. The corresponding STA may update CCA information on the basis of a transmission duration indicated by the field Transmission Duration 330. For example, during a transmission duration indicated by the field Transmission Duration 330, a Network Allocation Vector (NAV) may be set and access to a channel may be deferred. Further, an AP indicated by the field STA Addresses 340 and a DLS request for an STA which is performing uplink/downlink transmission may be deferred.

Figure 4:
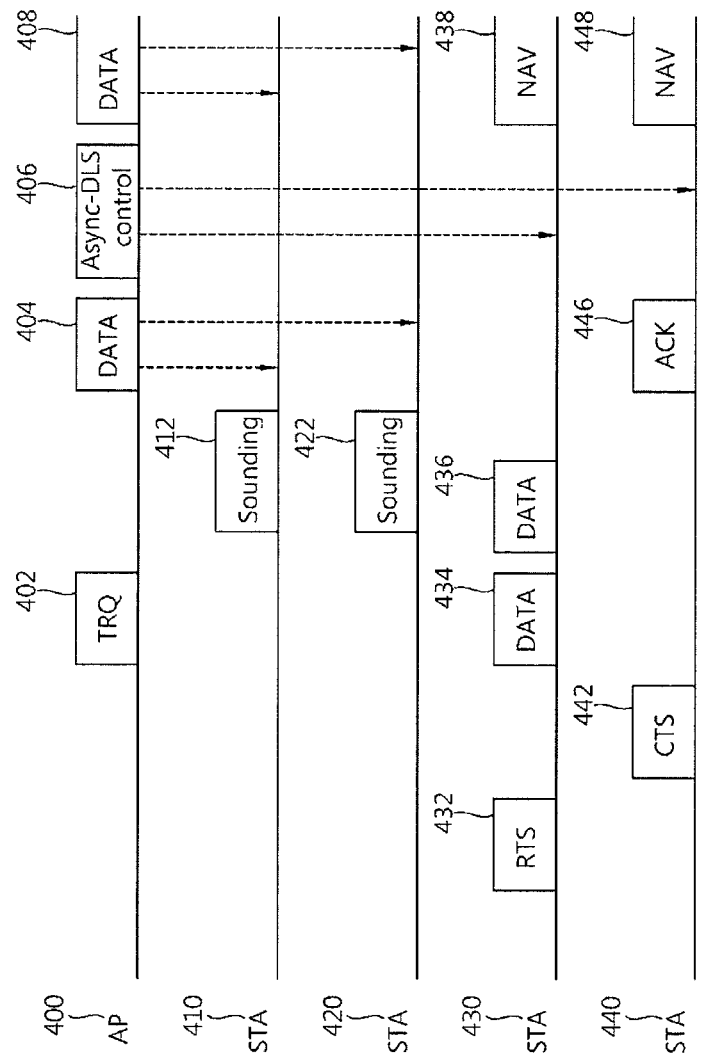
FIG. 4 is a diagram showing an example of a transmission method using Async-DLS in accordance with an embodiment of the present invention.

FIG. 4 is a diagram showing an example of a transmission method using Async-DLS in accordance with an embodiment of the present invention.

In the example of FIG. 4, an STA 3 430 sets up Async-DLS for an STA 4 440 in a first subchannel and transmits a data frame to the STA 4 440. An AP 400 transmits spatial multiplexed data to an STA 1 410 and an STA 2 420 in a second subchannel.

The STA 3 430 and the STA 4 440 perform the Async-DLS therebetween. Here, an Async-DLS setup procedure between the STA 3 430 and the STA 4 440 may be performed in accordance with the procedure illustrated in FIG. 1. The AP 400 sets an Async-DLS channel set to the first subchannel when the Async-DLS is performed and relays the set Async-DLS channel set to the STA 3 430 and the STA 4 440 so that they may perform the Async-DLS in the first subchannel. In the first subchannel, the STA 3 430 transmits an RTS frame 432 to the STA 4, and the STA 4 transmits a CTS frame 442 to the STA 3 430. In this process, the AP 400 and other STAs are informed that the first subchannel will be used for the Async-DLS. The AP 400, the STA 1 410, and the STA 2 420 may overhear the RTS frame and the CTS frame and defer access to the first subchannel. The STA 3 430 transmits DATA frames 434 and 436 to the STA 4 440. The STA 4 440 which has received the DATA frames 434 and 436 transmits an ACK frame 446 to the STA 3 430 in response to an ACK response.

During the time for which Async-DLS transmission is being performed between the STA 3 430 and the STA 4 440, the AP has started MU-MIMO downlink transmission to the STA 1 410 and the STA 2 420. The AP transmits a training request (TRQ) frame 402 to the STA 1 410 and the STA 2 420 (i.e., target STAs) through the second subchannel. In response thereto, the STA 1 and the STA 2 transmit respective sounding frames 412 and 422 to the AP. The TRQ frame 402 is used to estimate a channel with target STAs before the AP 400 performs SDMA transmission. The target STAs which have received the TRQ frame transmit respective sounding frames to the AP 400. The AP 400 may receive the sounding frames 412 and 422, perform beamforming by estimating a channel on the basis of the sounding frames, and transmit spatial multiplexed DATA frames 404 and 408 to the STA 1 410 and the STA 2 420. Here, when the STA 4 440 transmits the ACK frame 446 to the STA 3 430 and the Async-DLS is terminated, the AP transmits an Async-DLS control frame 406 to the STA 3 430 and the STA 4 440 which had participated in the Async-DLS before transmitting the DATA frame 408. The Async-DLS control frame 406 includes fields, indicating the STA 1 410 and the STA 2 420 (i.e., target STAs which will receive downlink transmission) in the second subchannel, and fields, indicating the DATA frame 408, a subsequent data frame, and a transmission duration, such as an ACK response frame.

The STA 3 430 and the STA 4 440 which have received the Async-DLS control frame 406 set an NAV, defer access to a channel, and defer a DLS setup request for STAs (i.e., the STA 1 410 and the STA 2 420) indicated by a station address field, for a transmission duration indicated by a duration field.

In the Async-DLS proposed by the present invention, the bandwidth of a channel is divided, and transmission through DLS and transmission through an MU-MIMO between an AP and one or more STAs are performed at the same time. Accordingly, the general throughput may be improved. For example, assuming that in the MAC/PHY of IEEE 802.11n, a channel bandwidth of 40 MHz, 4×4, a channel bandwidth of 80 MHz, and an AP and an STA support 8 and 4 RF chains, respectively, a data rate (PHY rate) may obtain a maximum of 1.2 Gbps in data transmission using conventional DLS. This is because the data rate of 1.2 Gbps corresponds to a data rate according to DLS transmission and if DLS is performed, SDMA transmission between the AP and the STA is not performed. However, if DLS transmission between STAs, not participating in SDMA transmission simultaneously with SDMA transmission between the AP and the STA, is made possible using Async-DLS proposed by the present invention, the data rate of 1.8 Gbps may be obtained when a bandwidth of 40 MHz is used in each of the Async-DLS transmission and the SDMA transmission. Consequently, a throughput gain of 600 Mbps may be obtained.

Figure 5:
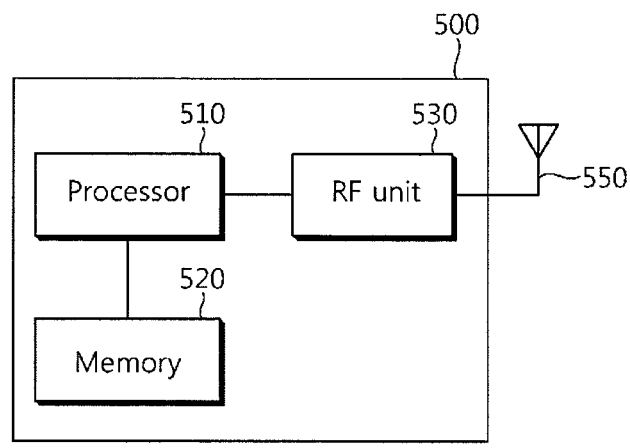
FIG. 5 is a block diagram of a wireless communication apparatus supporting Async-DLS according to an embodiment of the present invention.

FIG. 5 is a block diagram of a wireless communication apparatus supporting Async-DLS according to an embodiment of the present invention.

The wireless communication apparatus according to the embodiment of the present invention supports Async-DLS in a WLAN system and includes a processor 510, a Radio Frequency (RF) unit 530, and memory 520. That is, the wireless communication apparatus shown in FIG. 5 may perform Async-DLS and perform Async-DLS transmission.

The wireless communication apparatus includes the processor 510 and the RF unit 530. The memory 520 is operatively coupled to the processor 510 and is configured to store various pieces of information for driving the processor 510. The memory 520 may include Read-Only Memory (ROM), Random Access Memory (RAM), flash memory, a memory card, a storage medium and/or other storage device. The wireless communication apparatus may further include a display unit or a user interface (not shown), and a description of the display unit or the user interface is omitted.

The processor 510 may include an Application-Specific Integrated Circuit (ASIC), other chipset, a logic circuit and/or a data processing unit. The processor 510 may perform procedures of setting up Async-DLS and performing transmission through the Async-DLS and may generate a frame.

The RF unit 530 transfers the frame, generated by the processor 510, to another wireless communication apparatus and receives a frame from other wireless communication apparatus.

All the above-described methods may be performed by a microprocessor, a controller, a microcontroller, a processor such as an ASIC, or the processor of the apparatus shown in FIG. 3, wherein software or program codes for executing the methods are embedded. The design, development, and implementation of the software or the codes will be evident to those skill in the art from the description of the present invention.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a wireless local area network, the method comprising:
   receiving, by an access point (AP), a direct link setup (DLS) setup frame from at least one of a first station and a second station, the DLS setup frame including information about at least one first subchannel to be used for a communication of a DLS link between the first station and the second station;
   selecting, by the AP, at least one second subchannel to be used for a communication between the AP and a third station, wherein the at least one second subchannel is selected from a plurality of subchannels that do not include the at least one first subchannel;
   transmitting, by the AP, a control frame to the third station, the control frame including a channel field indicating the at least one second subchannel; and
   transmitting, by the AP, downlink data to the third station through the at least one second subchannel.

2. The method of claim 1, wherein the control frame further includes a duration field and an address field, the duration field indicating a time for which at least one second subchannel is to be used for the communication between the AP and the third station, the address field indicating the third station.

3. The method of claim 1, further comprising:
   determining, by the AP, whether the communication of the DLS link between the first station and the second station is finished,
   wherein the downlink data is transmitted to the third station after the communication of the DLS link between the first station and the second station is finished.

4. A device for a wireless local area network, the device comprising:

a radio frequency device configured to receive and transmit radio signals; and a processor configured to:
- instruct the radio frequency unit to receive a direct link setup (DLS) setup frame from at least one of a first station and a second station, the DLS setup frame including information about at least one first subchannel to be used for a communication of a DLS link between the first station and the second station,
- select at least one second subchannel to be used for a communication between the device and a third station, wherein the at least one second subchannel is selected from a plurality of subchannels that does not include the at least one first subchannel,
- instruct the radio frequency unit to transmit a control frame to the third station, the control frame including a channel field indicating the at least one second subchannel, and
- instruct the radio frequency unit to transmit downlink data to the third station through the at least one second subchannel.

5. The device of claim 4, wherein the control frame further includes a duration field and an address field, the duration field indicating a time for which at least one second subchannel is to be used for the communication between the AP and the third station, the address field indicating the third station.

* * * * *